United States Patent [19]

Boulton et al.

[11] Patent Number: 4,816,731
[45] Date of Patent: Mar. 28, 1989

[54] HONING MACHINE

[75] Inventors: Michael A. Boulton, Cheltenham; Joseph I. Roberts; Hamid R. Bassirat, both of MacClesfield, all of England

[73] Assignee: Delapena Honing Equipment Limited, Gloucestershire, England

[21] Appl. No.: 91,572
[22] PCT Filed: Dec. 16, 1986
[86] PCT No.: PCT/GB86/00767
  § 371 Date: Jul. 30, 1987
  § 102(e) Date: Jul. 30, 1987
[87] PCT Pub. No.: WO87/03712
  PCT Pub. Date: Jun. 18, 1987

[30] Foreign Application Priority Data

Dec. 16, 1985 [GB] United Kingdom ............... 8530921
Jun. 30, 1986 [GB] United Kingdom ............... 8615915

[51] Int. Cl.$^4$ ............................................. G05B 19/18
[52] U.S. Cl. ................................. 318/569; 51/34 C; 51/165.93
[58] Field of Search ............ 318/569; 51/34 C, 165.93

[56] References Cited

U.S. PATENT DOCUMENTS

| | | | |
|---|---|---|---|
| 3,126,672 | 3/1964 | Calvert et al. | 51/34 C |
| 3,404,490 | 10/1968 | Entabrook | 51/165.93 |
| 3,664,217 | 5/1972 | Schiewek et al. | 83/49 |
| 4,143,310 | 3/1979 | Fujinawa et al. | 318/571 |
| 4,418,305 | 11/1983 | Otsuki et al. | 318/616 |
| 4,455,789 | 6/1984 | Gehring | 51/34 J |
| 4,679,357 | 7/1987 | Richter et al. | 51/281 P |

FOREIGN PATENT DOCUMENTS

0046806 3/1982 European Pat. Off. .
0048431 3/1982 European Pat. Off. .
0051477 5/1982 European Pat. Off. .
0063983 11/1982 European Pat. Off. .

Primary Examiner—William M. Shoop, Jr.
Assistant Examiner—Saul M. Bergmann
Attorney, Agent, or Firm—Wenderoth, Lind & Ponack

[57] ABSTRACT

A honing machine in which a micro-processor controls reciprocation with respect to a work-piece of a spindle which carries honing stones, the micro-processor being associated with a memory unit which holds an acceleration profile in terms of position/time and being programmed to control reciprocation in accordance with the required acceleration characteristics. Variable stroke parameters and required mid-stroke speed are input from a console and the system ensures symmetrical honing under controlled acceleration regardless of any conflict between selected stroke length and mid-stroke speed.

7 Claims, 6 Drawing Sheets

HONING MACHINE

The invention relates to a honing machine. Honing machines are used for fine-finishing cylindrical bores in work-pieces such as automobile cylinder blocks and hydraulic and pneumatic components of all kinds.

In general, a honing machine has a rotatable spindle which carries at its end abrasive stones mounted in carriers which may be expanded radially. In a honing operation the spindle enters the bore in the work-piece and is rotated as the work-piece and spindle are reciprocated with respect to each other. Radial pressure is applied to urge the stones against the wall of the bore. Forward movement of the spindle causes the stones to trace a helical path in the bore in one sense and reverse movement of the spindle causes the stones to trace a helical path in the opposite sense. Consequently, a cross-hatched honing pattern is made in the bore. For optimum finishing it is found to be important to control the cross-hatch pattern accurately.

The cross-hatch angle is a function of the stroke velocity in relation to the spindle speed. Spindle speed can effectively be maintained constant by controlling a continuously rotating spindle motor of significant inertia. The problem of cross-hatch pattern control resolves itself, therefore, to control of stroke velocity. However, because of the reciprocating movement, the spindle must be repetitively accelerated and decelerated having regard to its position with respect to the work-piece.

In order to control stroke reversal in honing machines it has been the practice to use limit switches or mechanical trips for valves etc., near each end of the stroke. These may be micro-switches, proximity sensors, or the like which, when activated, reverse the drive to the stroke mechanism. The use of limit switches gives an inherently asymmetrical stroke velocity characteristic, and while offering repeatability, does not allow precision control. Often, the reciprocating mechanism is hydraulic. While this is a convenient way of driving a system for a large-scale machine with a high power requirement, it again does not lend itself to precision control. The characteristics of the hydraulic system change with temperature, for example. The present invention seeks to provide a honing machine offering very precise control, and while the principles are applicable to large-scale machines, the principal application for the invention is found in small-piece work where precision is particularly important.

According to one aspect of the invention there is provided a honing machine comprising a spindle; an expandable honing stone carrier at the end of the spindle; a drive motor for rotating the spindle; a direct-current stroke motor for reciprocating the spindle with respect to a work-piece; a position transducer arrangement for giving a digital output in accordance with the linear stroke position of the spindle with respect to the work-piece; a micro-processor; a memory unit for the micro-processor, which memory unit holds a predetermined acceleration profile look-up table; and an input console for manually applying input parameters, the micro-processor being programmed (a) to accept inputs from the console from which can be derived at least the required start and end positions of the stroke and the required mid-stroke speed of the spindle, (b) to sample the input from the position transducer arrangement periodically, (c) to compare the actual position of the spindle with the look-up table to drive a position error signal whereby the stroke motor is driven to correct the error and cause the spindle to follow the acceleration profile alternately in acceleration and deceleration modes, (d) to cause the spindle to continue at the mid-stroke speed between acceleration and deceleration when the mid-stroke speed is reached, and (e) to cause switching at the mid-stroke position from acceleration to deceleration mode if the required mid-stroke speed has not been reached.

This arrangement ensures symmetrical acceleration and deceleration of the spindle even if the required mid-stroke speed is not reached. This is important when the honing machine is to provide for a wide range of bore lengths, since for short bores and for short-stroke local honing the inertia of the system may prevent the required mid-stroke steady speed being met. The arrangement described ensures that the acceleration and deceleration modes have priority over the mid-stroke constant velocity mode. It is found that this ensures accuracy in achieving the end points of the bore which is again particularly important for small-piece work.

For example, it may be derived not only to set the stroke length manually but also to allow for automatic re-setting in response to gauging information, to correct perhaps for detected bore tape. Also, it is frequently necessary to include cycles of short-stroke honing within a main honing cycle, particularly for blind bores. With the arrangement in accordance with the invention, a required honing speed can be set and whereas this will apply to limit the speed for long strokes, the requirement will be automatically over-ridden when necessary for shorter strokes. This helps ensure the positional accuracy which is a feature of the preferred positional control system.

In the reciprocating motion there are six phases: forward acceleration; forward steady speed; forward deceleration; backward acceleration; backward steady speed; and backward deceleration. A preferred feature of the present invention is to provide a micro-processor program which cycles successively between these six phases and which skips and steady speed phases if necessary. Furthermore, a single acceleration curve, preferably stored in position/time form can be used for all accelerations and decelerations of a cylce, regardless of stroke length, by reading the curve in the appropriate direction according to the acceleration/deceleration phase concerned. Thus, symmetry of acceleration/deceleration is ensured and it is not necessary to store a full position/time or velocity/ time curve in the computer memory.

Since the spindle velocity slows at the ends of the stroke and since it is impracticable to change the rotational speed rapidly, the cross-hatch pattern at the ends of the stroke will be different from that in the middle. To achieve an optimum pattern in the middle for as great a length as possible it should be ensured that the velocity during the middle of the stroke is constant at the required value and that acceleration and deceleration are as rapid as possible Maximum acceleration is governed by the torque of the stroke motor, the inertia of the stroke mechanism, and frictional resistance, due largely to the frictional honing force. Generally, therefore, the acceleration profile will be calculated to give substantially the maximum acceleration and deceleration available, having regard to the parameters of the system. However, excessive accelerations and decelerations may cause impact damage, particularly with small work-pieces. A different shaped profile will then be appropriate. The memory unit may include a family of acceleration position/time profiles, means being provided to select the appropriate one for a particular purpose. Alternatively, different profiles may be contained in different plug-in ROM chips which are interchangeable. In another arrangement the micro-processor may be programmed to calculate a profile table at the start of a honing operation and to place the table in RAM.

In order to achieve a required cross-hatch pattern the velocity during the constant velocity period in the middle of the stroke should have a particular relation to the circumferential velocity of the bore. This depends on the diameter of the bore and the rotational spindle speed. For a given bore diameter the stroke velocity should therefore be adjusted in accordance with spindle speed. For many purposes there is a cross-hatch angle (i.e. angle of stone traverse with respect to the axis of the bore) which is optional. Typically, the optional angle may be a particular angle between 40° and 65°. The micro-processor could therefore be pre-set to achieve any required cross-hatch angle in the middle of the stroke for all bores. Alternatively, however, a required cross-hatch angle input can be made at the console, whereby the microprocessor will modify the correction output to produce a different constant velocity.

In order to calculate the correction output, the micro-processor requires the rotary spindle speed. This can be derived from a tacho-generator coupled to the spindle motor. Alternatively, spindle speed can be set from the console, and the input to the micro-processor can be derived from the speed setting.

The micro-processor program may be modified to provide exaggerated local honing within the main honing cycle. For example, it may be desired to effect local honing of the end of a blind bore, either to compensate for under-honing or even to provide a tapered bore. This facility may also be effective to correct tapered bores. For this purpose the facility may be provided to specify a short-stroke cycle which has its own restricted end points, presettable, and a given number of strokes. Thus, for example, it may be specified that in each main honing cycle, five short strokes are executed over the innermost 10% of the stroke length.

The invention is applicable to an arrangement in which the spindle is fixed relative to a bed and the work-piece is reciprocated by the stroke motor. However, it is preferred to provide that the work-piece is fixed and the spindle is reciprocated. Drive for the reciprocating spindle could be given through splines from a fixed spindle motor. However, it is a preferred feature of the invention that the spindle motor is mounted to be reciprocated with the spindle, the whole assembly being driven by the stroke motor. This has the advantage that the weight of the reciprocating assembly is fixed, regardless of the weight of the work-piece, and spline friction has no effect. Thus, the acceleration characteristics of the assembly are largely predictable and can be embodied in the position/time profile table without giving rise to significant errors.

The spindle motor/spindle assembly can be mounted on a sled which can be driven by the stroke motor through a local screw or by means of a chain drive. Naturally, there should be as little backlash in the system as possible.

The position transducer arrangement can comprise a linear transducer fixed to the bed of the machine, for example a linear inductoryn or optical grating. In a preferred embodiment of the invention, however, the transducer arrangement comprises a rotary digital encoder fixed to the spindle of the stroke motor. It is found that this gives a high degree of accuracy, particularly when used in conjunction with a lead screw drive.

The invention will further be described with reference to the accompanying drawings, of which.

Figure 1:
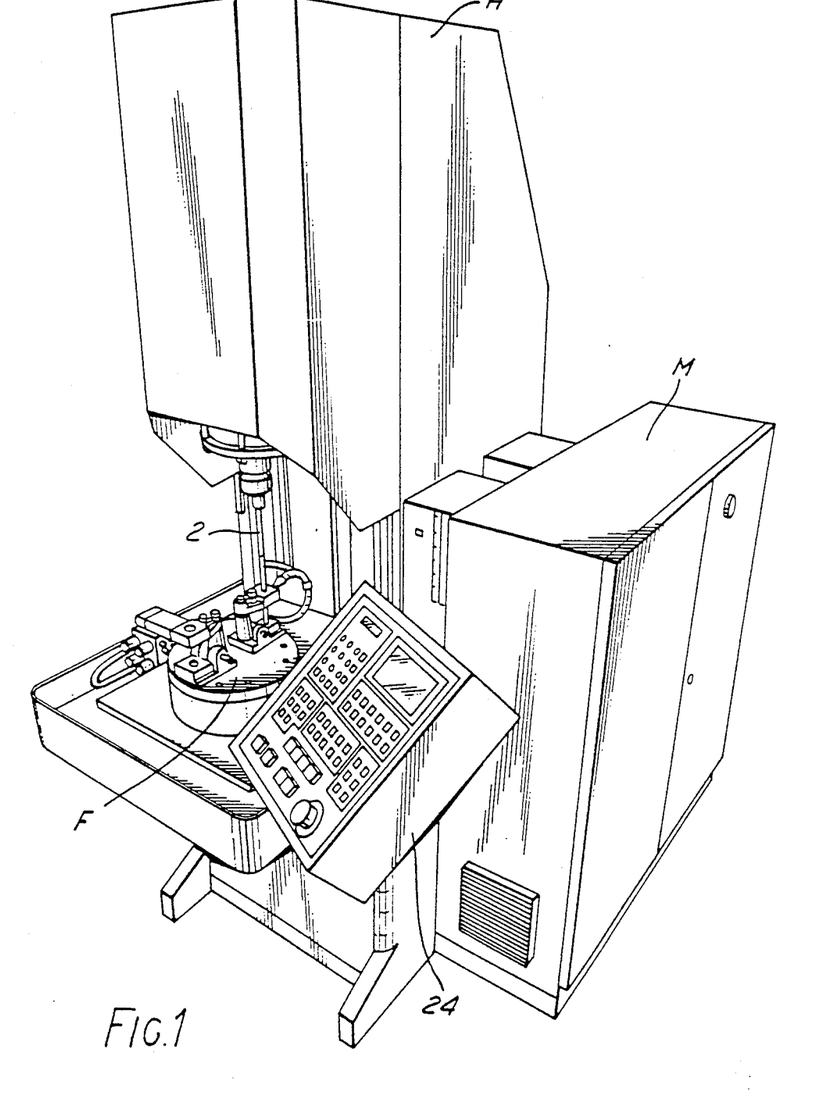
FIG. 1 is a perspective view of a honing machine which embodies the invention.

Referring to FIG. 1 there is shown a honing machine for honing a work-piece mounted on a table fixture F. A honing spindle 2 carries honing stones at its end which engage the wall of the bore in the work-piece to effect honing. The spindle is rotated by a spindle motor (not shown in FIG. 1) which is mounted on a carriage which reciprocates vertically on runners under control of a stroke motor mounted in housing H. Control of the machine is effected by a micro-processor housed in a housing M. A console 24 allows an operator to set various parameters for controlling the machine.

Figure 2:
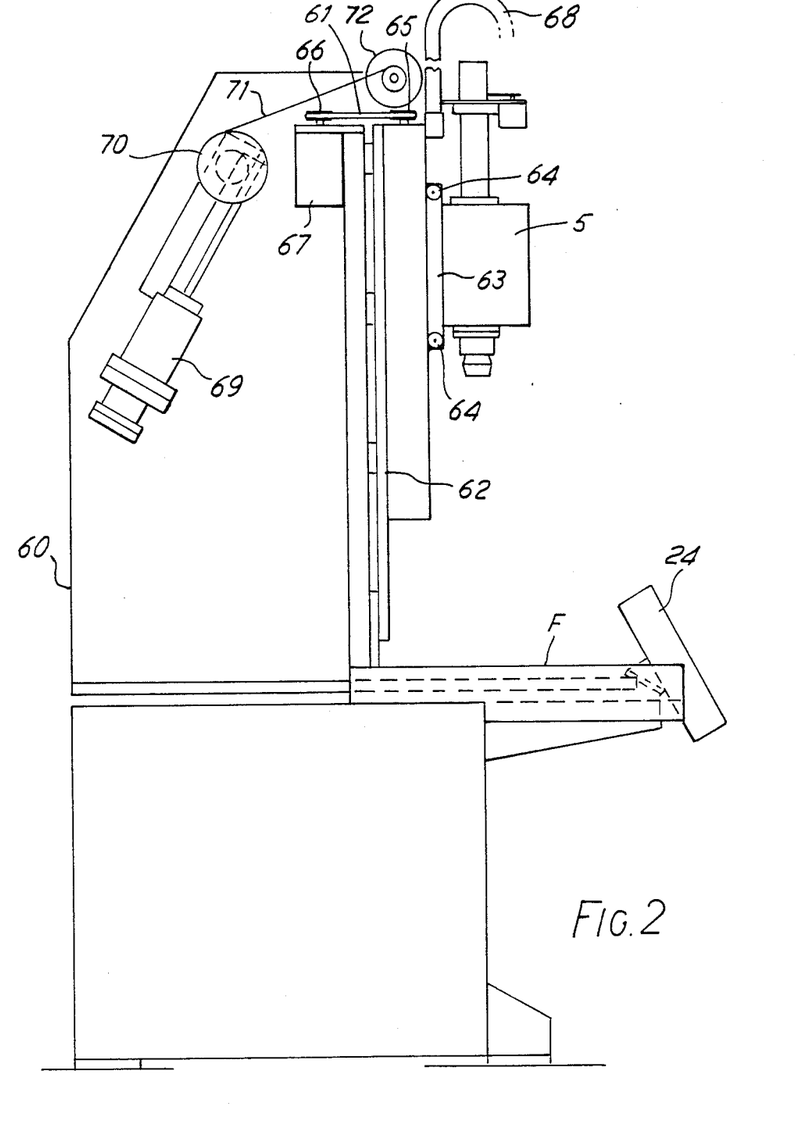
FIG. 2 is a side elevation of the machine of FIG. 1.

FIG. 2 shows the structure of the machine in more detail. The machine has a frame 60 which supports the table fixture F where work-pieces are clamped. The frame provides vertical runners 62 on which is guided a carriage 63 which has rollers 64. Linear bearings may alternatively be used. A lead-screw is mounted vertically and has a drive pulley 65 at its upper end. Pulley 65 is coupled by a toothed belt 61 to a pulley 66 on a motor 67. The spindle motor is shown at 5 mounted on the carriage and power is conveyed to it by a flexible cable 68.

A counter-balance arrangement comprises a hydraulic cylinder 69 having a piston which is coupled to the carriage by a chain and pulley arrangement 70, 71, 72. Pressure in the cylinder is controlled to provide a force which precisely counterbalances the weight of the carriage and spindle motor. This arrangment has less inertia than a counter-weight would have.

Figure 3:
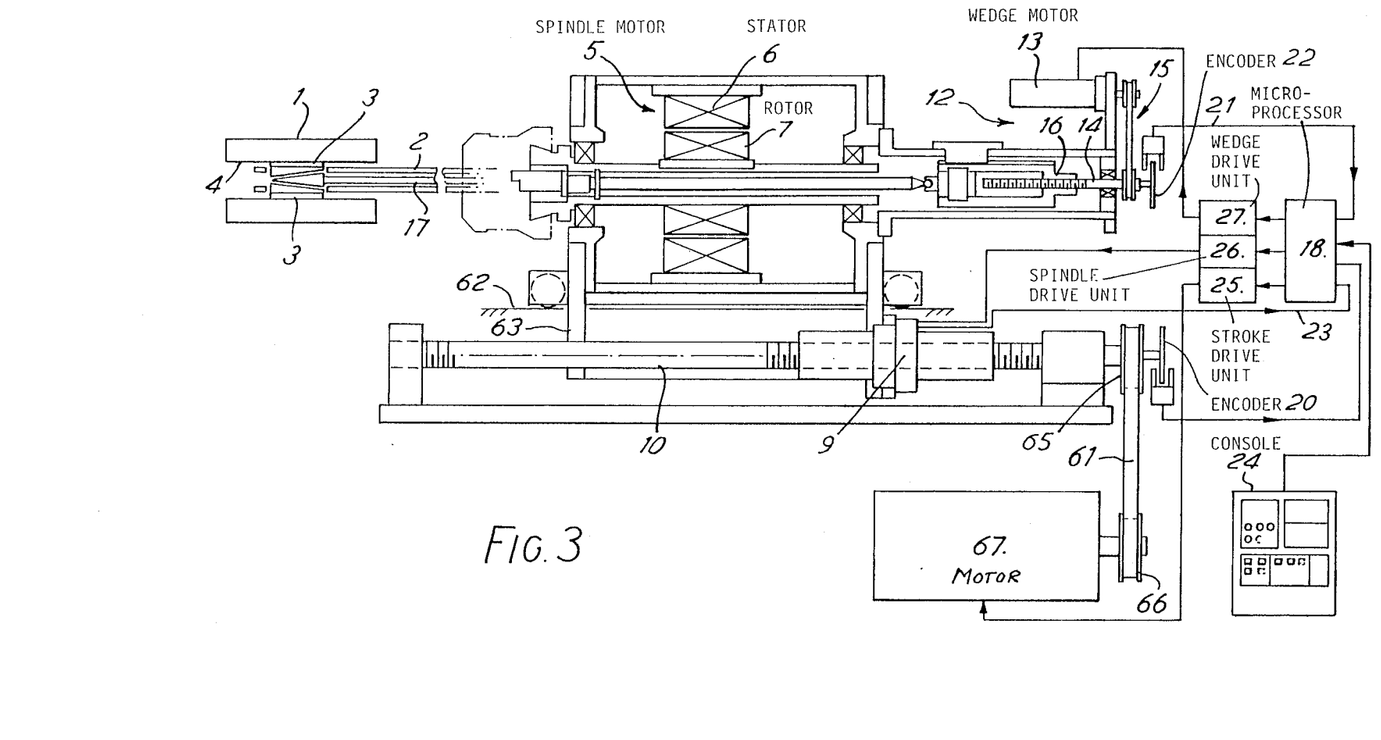
FIG. 3 is a schematic diagram illustrating the principles of operation of the machine.

The machine of FIGS. 1 and 2 is a vertical honing machine in which carriage 63 reciprocates vertically, with a counter-balance system as described. However, the principles of the machine apply equally if the carriage is arranged to reciprocate at angles with respect to the vertical, with suitable adjustment of the couterbalance forces. If the carriage reciprocates horizontally, no counterbalancing is required. FIG. 3 illustrates the principles of the machine in a horizontal arrangement. The work-piece being honed is shown at 1 and is fixed. The honing spindle 2 carries the honing stones 3 at its end which engage the wall of the bore 4 in work-piece 1 to effect honing. The spindle motor 5 is a 3-phase a.c. motor which comprises a stator 6 and a rotor 7. Rotor 7 has a hollow core which accommodates the hollow spindle 2.

The carriage 63 which rides on runners 62 and linear reciprocating movement is imparted to the carriage by a lead screw 10 which runs in a nut 9 in the carriage.

The lead screw is turned by the direct-current stroke motor 67 via toothed belt 61.

Mounted on stator 6 is a wedge control system 12 which comprises a direct-current wedge motor 13 which drives a lead screw 14 via a toothed belt and pulley system 15. A nut 16 runs on screw 14 and this is coupled to wedge drive strips 17. At the other end of strips 17 is a wedge expansion system which expands the stones 3 outwardly in response to forward axial movement of the strips. The stones are thus urged against the wall of the bore.

The use of a rotor/stator assembly with a hollow rota mounted to reciprocate on the carriage allows the wedge control system to be bolted directly to the stator and the mechanical linkage from the wedge motor to the wedge strips is thus direct without the necessity to by-pass a pulley drive or splined drive system. This enhances the wedge control accuracy.

Control of the system is effected by a micro-processor 18. The micro-processor receives an input on line 19 from a rotary position encoder 20 fixed to the shaft of the stroke motor 11. This input represents the position of the carriage 63. Another input is received on line 21 from a rotary encoder 22 fixed to the lead screw 14. This input represents the radial position of the stones 3. A further input is received on line 23 from a drive amplifier (not shown) for the spindle motor. This is a frequency input representative of the speed of the spindle motor. Further inputs are applied to the micro-processor from a console 24 which has manually operable push-buttons whereby the operator may set all functions and requirements for the honing operation.

The micro-processor applies control outputs to a stroke drive unit 25 which drives the stroke motor; a spindle drive unit 26 which drives the spindle motor; and a wedge drive unit 27 which drives the wedge motor.

Figure 4:
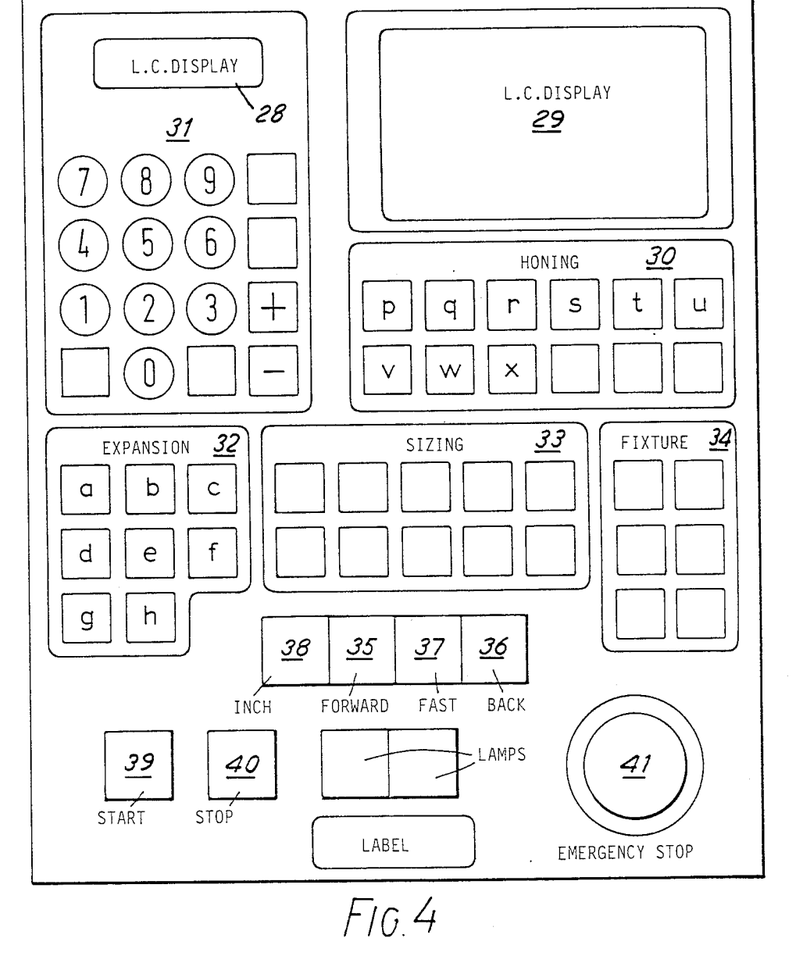
FIG. 4 is a diagram of the control console of the machine.

FIG. 4 shows the layout of the console 24. The console allows machining and wedge parameters to be put into the micro-processor. Two liquid-crystal displays 28 and 29 allow the parameters to be displayed as they are input. The inputs may be recalled at will. A machine parameter key-pad 30 has keys for setting the following parameters: hone park (p); start point (q); end point (r); required spindle velocity (s) (mid point); rotary spindle speed (t); stroke length (u); short stroke length (w); and number of short strokes (x). In order to set a figure for one of the parameters the numerical key-pad 31 is used after depression of the appropriate parameter key. Also, there is a test mode facility on key-pad 30.

A wedge parameter key-pad 32 has keys for setting the following parameters; stone pressure (a); wedge angle (b); stones worn (c); maximum stone pressure (d); retract distance (e); stones in contact (f); approach or initial feed speed (g); and honing, or final feed speed (h).

A sizing key-pad 33 has keys for setting the following sizing parameters: plug mode; timer mode; timer set; stone wear set; manual compensate; automatic compensate; tolerance; diametric clearance and match gauge.

A fixture key-pad 34, which relates to control of the work-piece fixture F, has keys for the following functions: manual; step; auto-load; and manual clamp.

There are manual controls for adjusting the position of the spindle. Key 35 moves the spindle forwards, key 36 moves it back and "fast" and "inch" keys 37 and 38 control the speed of adjustment. Finally there are start and stop cycle keys 39, 40, an emergency stop key 41 and a "controls on" and a datum key 42 and 43 respectively.

Figure 5:
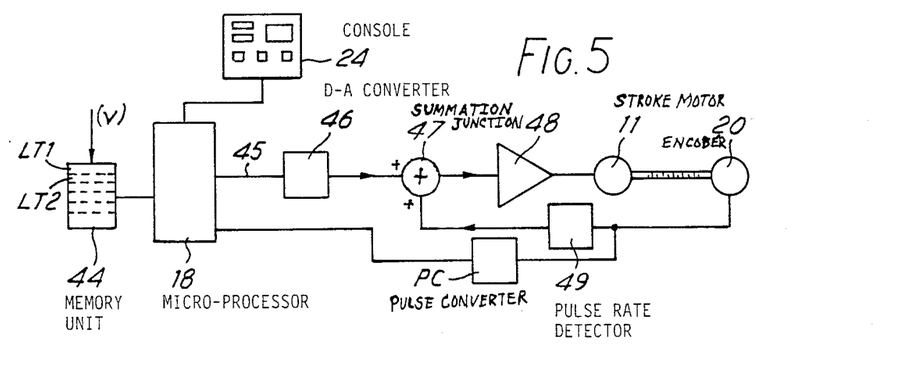
FIG. 5 is a block diagram of the stroke control circuit of the machine.

FIG. 5 is a block diagram of the drive circuit for the stroke motor 11. The micro-processor is shown at 18 and has associated with it a memory unit 44. Unit 44 carries a set of look-up tables LT1, LT2 . . . etc. Each table is a table of values relating distance to time as a position/time profile for required acceleration and deceleration of the carriage 63. The profiles are constructed from the known characteristics of inertia of the stroke mechanism, frictional resistance and motor torque and in this embodiment are stored permanently in ROM. The different tables represent different respective accelerations and the table used for a particular honing operation is selected by means of the acceleration input (v). In the absence of a selected input the table giving the highest acceleration is chosen. In the particular machine described the highest acceleration is 1.2g. Acceleration is capable of being set in steps of 0.2g from 0.2g to 1.2g. In some embodiments of the invention this upper limit may be higher.

The micro-processor receives input from the console 24, which defines at least the end of stroke positions required. There are different possible ways of inputting this information. For example, the two stroke end positions may be defined, or one end position and the stroke length or the mid-stroke position and the stroke length, for example. Also derived from console 24 is an input representative of the set spindle speed. An input of position is derived from the position encoder 20 of the stroke motor 11 via a pulse counter PC. This is sampled by the micro-processor regularly, typically every 2 m.Sec. Having regard to the position/time table in memory unit 44 snd the inputs applied from console 24, the micro-processor produces a correction output on line 45.

The correction output is applied to a digital-to-analogue converter 46 which produces a speed input signal to a summing circuit 47. The output from circuit 47 is applied to a amplifier 48 to drive the stroke motor 11. A pulse rate detector 49 gives an output proportional to the speed of the motor and this is fed back to the summing circuit 47 to be subtracted from the speed input signal from converter 46.

Figure 6:
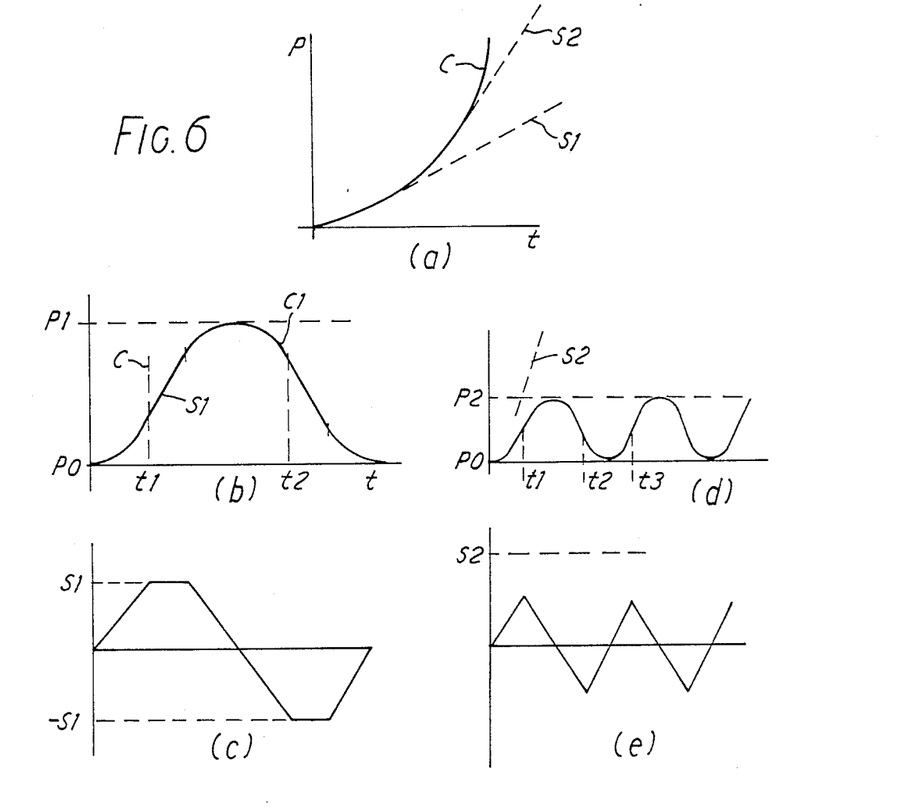
FIG. 6 is a set of graphs illustrating the stroke control system of the machine.

Referring now to FIG. 6 there is shown at (a) look-up table LT1 of FIG. 5 represented as a graph of position against time. In the memory unit this is stored in digital form as a series of positions at spaced intervals of time—in this embodiment the intervals are 2 msec. The table is constructed from the motion equation $p = \frac{1}{2}at^2$, where p is position, a is position and t is time. The control system drives the carriage 63 to follow the position curve C until the input mid-stroke speed is reached. Two speeds are shown at S1 and S2 in FIG. 6(a).

FIG. 6(b) shows part of the position/time curve for a control cycle with the mid-stroke velocity set to S1 and the end of the stroke position set to P1, the beginning of the stroke being at PO. At the beginning of the stroke the carriage follows the acceleration curve C. When the speed reaches S1 at time t1, acceleration ceases and the carriage is controlled to proceed at speed S1. Deceleration starts at an equal distance from the mid-stroke position that acceleration ceased. To determine deceleration, the curve C is read from the look-up table taking the position as the distance to the end of stroke position. When speed S1 is reached in the reverse direction, acceleration in the reverse direction ceases at time t2, and so on.

FIG. 6(c) is a velocity/time curve corresponding to the position/curve of FIG. 6(b). It will be seen that the curve of FIG. 6(c) is trapezoidal, having flat regions where the carriage speed is constant at S1.

FIG. 6(d) is a position/time curve in which the stroke end position has been set at p2 for a short stroke and the mid-stroke speed has been set at S2. However, the carriage cannot achieve speed S2 before the mid-stroke position. Under these circumstances the control system operates to over-ride the velocity demand and simultaneously cease acceleration and start deceleration at the mid-stroke position (time t1). Similarly, at time t2 and t3 there are sudden reversals of acceleration. The corresponding velocity/time curve is shown in FIG. 6(e). It will be seen that this has a triangular shape and speed S2 is never reached.

Figure 7:
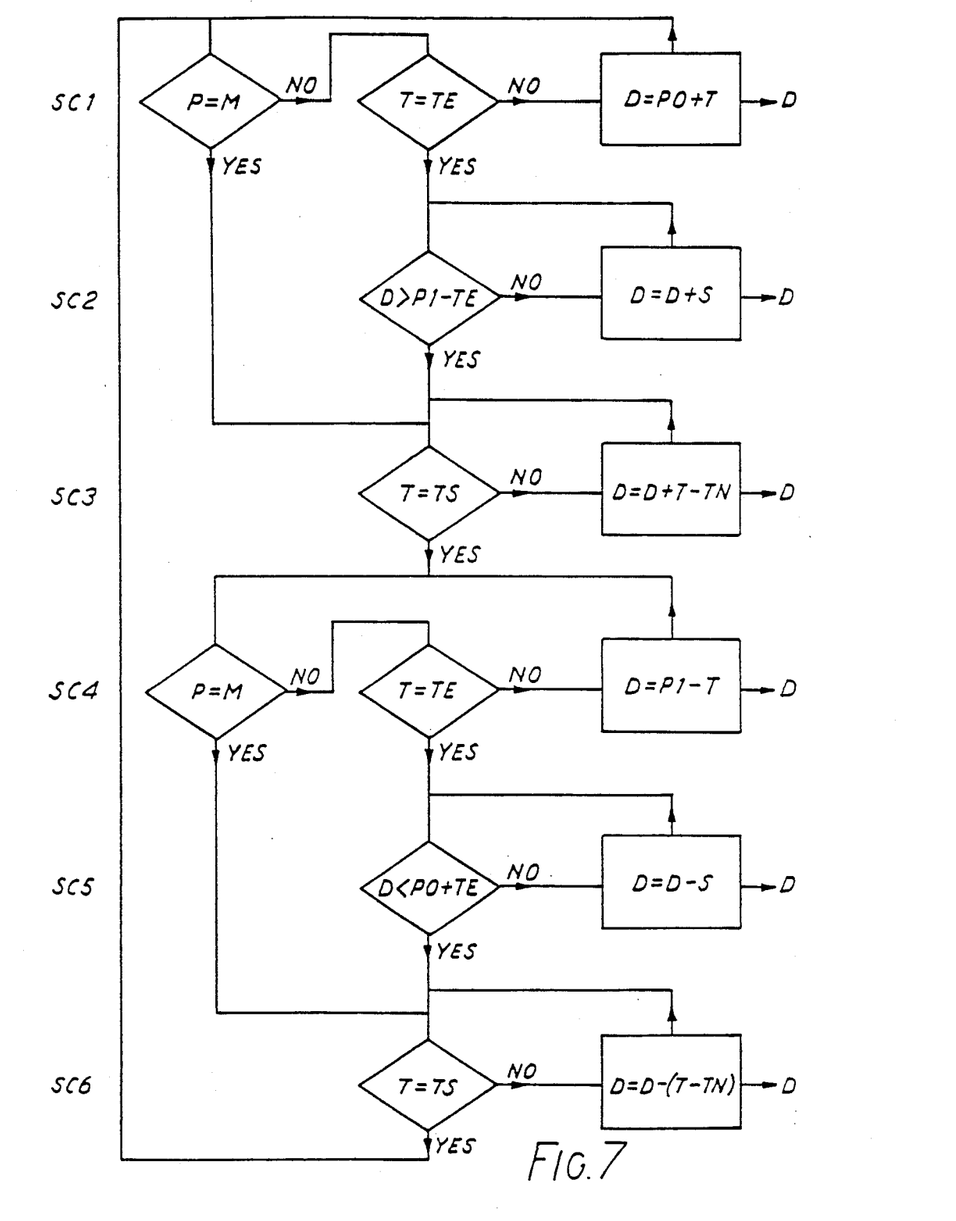
FIG. 7 is a diagram illustrating a program flow-chart of the machine.

FIG. 7 is a diagram showing the flow-chart for the micro-processor program which achieves the characteristics described. The cycle of movement has six sub-cycles, SC1 to SC6. These are selected in sequence according to the prevailing time and position of the carriage. The demand signals generated are position demands which cause the control circuit to issue velocity control signals to the carriage motor. The sub-cycles merge sequentially with one another.

In the diagram, the current time is t; the current position of the spindle (derived from the encoder) is P; the current look-up table position value is T; the next table position is TN; the start position of the stroke is PO; the end position of the stroke is P1; the mid-point of the stroke is M; the required mid-stroke speed is S; the table-end position (dT/dt =S) is TE; the table start position (dT/dt =0) is TS; and the demand position applied to the control circuit is D.

The functions of the respective sub-cycles are:
SC1 - forward acceleration
SC2 - forward steady speed
SC3 - forward deceleration
SC4 - backward acceleration
SC5 - backward steady speed
SC6 - backward deceleration It will be seen that sub-cycles SC2 and SC5 may be skipped if the set-in steady speed is not achieved.

We claim:

1. A honing machine comprising a spindle; an expandable honing stone carrier at the end of the spindle; a drive motor for rotating the spindle; a direct-current stroke motor for reciprocating the spindle with respect to a work-piece; a position transducer arrangement for giving a digital output in accordance with the linear stroke position of the spindle with respect to the work-piece; a micro-processor; a memory unit for the micro-processor, which memory unit holds a predetermined acceleration profile look-up table; and an input console for manually applying input parameters, the micro-processor being programmed (a) to accept inputs from the console from which can be derived at least the required start and end positions of the stroke and the required mid-stroke speed of the spindle, (b) to sample the input from the position transducer arrangement periodically, (c) to compare the actual position of the spindle with the look-up table to derive a position error signal whereby the stroke motor is driven to correct the error and cause the spindle to follow the acceleration profile alternately in acceleration and deceleration modes, (d) to cause the spindle to continue at the mid-stroke speed between acceleration and deceleration when the mid-stroke speed is reached, and (e) to cause switching at the mid-stroke position from acceleration to deceleration mode if the required mid-stroke speed has not been reached.

2. A honing machine as claimed in claim 1 wherein in each cycle of reciprocating motion, control is exercised successively in six phases: forward acceleration; forward steady speed; forward deceleration; backward acceleration; backward steady speed; and backward deceleration, and means are provided for detecting when the spindle is at the mid-stroke position and for switching from acceleration to deceleration if the required mid-stroke speed has not been reached.

3. A honing machine as claimed in claim 1 or claim 2 wherein the profile table contains only information relating to the required acceleration and deceleration of the spindle, and control at steady speed is exercised by computer calculation with reference to the mid-point speed input for amplitude and to the required stroke parameters for length.

4. A honing machine as claimed in claim 1 or claim 2 wherein the memory unit holds a plurality of acceleration profile look-up tables for different accelerations, the console has an input provision for selecting required acceleration and the micro-processor is programmed to refer to the look-up table appropriate to the acceleration selected.

5. A honing machine as claimed in claim 1 or claim 2 wherein the stroke motor is driven in response to a demand voltage to determine the motor velocity, the voltage being derived from a positional error signal, the positional error signal being generated by comparison of a position signal feed-back from the encoder with a position signal derived from the look-up table, mid-stroke speed and stroke parameters, there being a velocity feed-back loop which adjusts the input voltage to the motor having regard to the demand voltage and a speed signal feed-back from a speed detector coupled to the motor.

6. A honing machine as claimed in claim 5 wherein the speed detector is a pulse rate detector connected to the encoder.

7. A honing machine as claimed in claim 1 or claim 2 wherein the stroke motor drives a carriage on which the spindle motor is mounted, the spindle motor and spindle thereby being reciprocated with respect to the work-piece.

* * * * *